United States Patent
Tysinger et al.

(10) Patent No.: US 6,511,690 B1
(45) Date of Patent: Jan. 28, 2003

(54) SOYBEAN OIL PROCESS

(75) Inventors: Jerry E. Tysinger, Kenansville, NC (US); Jerry F. Richmond, Raleigh, NC (US); Robert B. Dawson, Kinston, NC (US); Walter E. Farr, Collierville, TN (US)

(73) Assignee: Carolina Soy Products, Inc., Warsaw, NC (US)

( * ) Notice: Subject to any disclaimer, the term of this patent is extended or adjusted under 35 U.S.C. 154(b) by 184 days.

(21) Appl. No.: 09/775,105

(22) Filed: Feb. 1, 2001

(51) Int. Cl.[7] .............................. C11B 1/00; C11B 1/10; C11B 3/00

(52) U.S. Cl. ........................ 426/489; 426/634; 426/492; 554/9

(58) Field of Search ............................... 426/489, 634, 426/492; 554/9

(56) References Cited

U.S. PATENT DOCUMENTS

| | | |
|---|---|---|
| 4,049,686 A | 9/1977 | Ringers et al. |
| 4,089,880 A | 5/1978 | Sullivan |
| 4,255,346 A | 3/1981 | Kock |
| 4,267,118 A | 5/1981 | Trueblood et al. |
| 4,515,726 A | 5/1985 | Sullivan |
| 4,584,141 A | 4/1986 | Paulitz et al. |
| 4,698,185 A | 10/1987 | Dijkstra et al. |
| 4,808,426 A | 2/1989 | Strop et al. |
| 4,944,954 A | 7/1990 | Strop et al. |
| 5,239,096 A | 8/1993 | Rohdenburg et al. |
| 5,278,325 A * | 1/1994 | Strop et al. |
| 5,362,893 A | 11/1994 | Muylle et al. |
| 5,516,924 A | 5/1996 | van de Sande et al. |
| 5,981,781 A | 11/1999 | Knowlton |
| 6,033,706 A | 3/2000 | Silkeberg et al. |

* cited by examiner

*Primary Examiner*—Anthony J. Weier
(74) *Attorney, Agent, or Firm*—MacCord Mason PLLC

(57) ABSTRACT

A solvent extraction free, caustic refining free, process for producing refined soybean oil from soybeans is described in which soybeans, after cleaning, cracking and dehulling, are extruded through a screw extruder in less than 30 seconds while heating the soybeans to a frictionally generated temperature of from about 300° F. to about 370° F. These conditions produce soybean oil that is low in nonhydratable phospholipids. As a result, free fatty acids can be removed through physical refining, instead of previously employed caustic refining, since the low level of nonhydratable phospholipids does not create undesirable flavors during the physical refining process. The process also includes conventional degumming and bleaching of the soybean oil after extraction and before physical refining.

17 Claims, No Drawings

SOYBEAN OIL PROCESS

BACKGROUND OF THE INVENTION (1) Field of the Invention

The present invention relates generally to a process for extracting and refining soybean oil and to the resultant product, and in particular to a soybean oil process that does not require caustic refining to remove free fatty acids.

(2) Description of the Prior Art

Soybean oil production involves several steps that are necessary to render the soybean oil suitable for human consumption. These production steps may be broadly characterized as 1) soybean preparation, 2) oil extraction, and 3) oil refining. Soybean preparation generally includes the steps of cleaning, drying, cracking, and dehulling. These steps are well known in the prior art.

Oil extraction is for the purpose of separating the oil from the remainder of the soybean, known as soybean meal. In a prior art process known as expelling, the oil is extracted by passing the dehulled beans through a screw press to crush the beans and separate the oil from the meal. This process has rarely been used to process soybeans due to the fact that a large percentage, up to 25%, of the soybean oil is left in the meal.

The great majority of commercial soybean extraction processes use a solvent to separate the oil from the meal. In the solvent extraction process, the beans are flaked to provide a large surface area. A solvent, commonly hexane, is then pumped through the soybean flakes, dissolving the oil in the hexane. The hexane is then separated from the oil and recycled.

The crude oil resulting from the extraction process must then be subjected to additional treatments, collectively called "refining", to remove various materials in order for the oil to be suitable for consumption. These materials include hydratable and non-hydratable phospholipids, free fatty acids, and various color and flavor components.

Crude soybean oil contains phosphorous compounds called hydratable phospholipids, and small amounts of calcium and magnesium that complex with a portion of the phospholipids to form non-hydratable phospholipids. Hydratable phospholipids are normally removed by a process known as "degumming", in which the oil is agitated or otherwise intimately combined with water to precipitate gums from the oil. The gums are then removed by centrifugation.

These precipitated gums can be used as a feed additive, or evaporated to remove moisture, the end product is called lecithin. Lecithin has various end uses such as food emulsifier. The degummed oil is dried under vacuum to remove any water. Removal of non-hydratable phospholipids is considerably more difficult and expensive, requiring further chemical treatment, typically chemical refining, to break the chemical bonds between the calcium or magnesium ions and the phospholipids, followed with extensive bleaching of the oil.

In most processes, free fatty acids are then removed from the oil by a process known as caustic refining, also called chemical or alkali refining, in which the oil is mixed with a caustic material, such as sodium or potassium hydroxide, which undergoes a saponification reaction with the acids, forming soaps that are then removed by centrifugation. In this case, the non-hydratable phosphotide are removed along with the free fatty acids. Chemical refining soybean oil is an expensive process, requiring a large investment in capital equipment. In addition, a significant quantity of the oil is captured by the soaps, adversely affecting oil yield. Also, the caustic refining process produces soapstock, which has no commercial value, and it is difficult to dispose of without environmental problems. Therefore, attempts have been made to develop more economically viable processes for removal of free fatty acids.

Free fatty acid removal by a process known as physical refining has been used for oils that are low in non-hydratable phospholipids, such as lauric oils, particularly palm oil. In physical refining, the oil is vacuum distilled at high temperatures, e.g., from about 450° F. to about 500° F., to separate more volatile components from the oil. This process is used to remove various flavor components, and will also remove free fatty acids. However, the process has not been viable for removing free fatty acids from oils such as soybean oil, which contains higher levels, i.e., more than 20 ppm based of phosphorous content, of non-hydratable phospholipids. The high temperatures required for physical refining tend to break down the non-hydratable phospholipids that are present in the soybean oil, producing chemical compounds that cause an unacceptable flavor and color.

As noted previously, the amount of non-hydratable phospholipids can be reduced by additional treatment steps involving chemical treatment, followed by extensive bleaching. However, these steps add substantially to the cost of production. For example, formerly described processes for physical refining of soybean oil require the removal of non-hydratable phospholipids with the use of at least 0.60% silica and 1.5% clay based on the weight of the oil. Since the silica and clays cannot be reused, these quantities add considerably to the cost of production. Moreover, a significant quantity of oil is lost in these high dosages of silica and clay. These high costs make these processes unattractive compared to chemical refining.

Conventional refining processes also involve some bleaching of the soybean oil to remove color pigments that adversely affect the color of the oil. However, removal of these color pigments requires substantially less silica and clays than is required to remove non-hydratable phospholipids. For example, silica usage may be as low as 0.05%, and bleaching clay may be only about 0.5% of the weight of the oil.

Finally, chemicals that add flavors to the oil are removed by a process known as "deodorization", which is essentially a form of physical distilling, in which the oil is subjected to high temperatures under a vacuum for a short period of time, which is sufficient to remove the flavor-causing components, but insufficient to break down non-hydratable phospholipids.

Thus, there remains a continuing need for a soybean oil refining process in which free fatty acids could be removed during the deodorization or physical refining step of the refining process, instead of by chemical or caustic refining. In addition, there is a need for a soybean oil extraction process that would permit soybean oil extraction from soybeans, without the need for solvent extraction, such as with hexane, moreover, there is a need for a non-solvent extraction process that produces a lower level or non-hydratable phosphotides.

SUMMARY OF THE INVENTION

The present invention is directed to an improved, non-solvent process for extracting soybean oil from soybeans that reduces the amount of nonhydratable phospholipids in the crude soybean oil, combined with a caustic-free soybean oil refining process in which the free fatty acids are removed from the soybean oil by physical refining, instead of by caustic or chemical refining. The invention is also directed to the resultant soybean oil product.

Generally, the present process is based on physical extraction of the soybean oil, as opposed to solvent extraction, and includes the steps of extruding the oil under defined temperature and time conditions. The oil is physically separated from the soybean meal by forcing the cleaned and dehulled beans through a screw extruder to crush the soybeans between the extruder screw and outer casing. During extrusion, considerable heat is generated due to the friction between the beans and the extruder.

Surprisingly, it has been found that the percentage of non-hydratable phospholipids in the crude oil is considerably lower, e.g., less that 20 ppm based on the weigh of phosphorous, if the soybeans are heated during the extrusion process to a temperature within the range of from 300° F. to 370° F. Preferably, the temperature range within the extruder is from about 315° F. to about 335° F. Care should be exercised in using temperatures above about 350° F., since the oil will tend to scorch, causing an off taste in the final product. Also, failure to heat the oil to at least 300° F. will fail to destroy sufficient trypsin inhibitors.

The time during which the soybeans are heated, i.e., the dwell time within the extruder, is also critical to the invention. Heating of the beans for at least 10 seconds at the required temperature has been found to be necessary to achieve sufficient oil extraction. However, heating of the beans at the required temperature for longer than about 30 seconds degrades the desirable tocopherols in the oil. Therefore, the extrusion time should be less than about 30 seconds, and preferably from about 10 to about 15 seconds.

The extruder should meet certain dimensional and operating requirements in order to heat the beans to within the desired temperature range, and to achieve sufficient crushing, within the desired time period. Generally, it has been found that the length of the extruder conduit, i.e., the distance from the entry end of the conduit to the exit end, should be about 15 inches. Extruders of the type used in the present process are manufactured by Insta-Pro International, Des Moines, Iowa.

Since the soybean meal from the extrusion process will still include a large percentage of oil, the soybean meal is preferably pressed to remove additional oil. This pressing can also be conducted with a horizontal screw extruder, known as an expeller, also manufactured by Insta-Pro International, but at lower temperatures. The oil from the expeller process can then be combined with the oil from the extrusion process for further treatment. The soybean meal will still contain about 6% soybean oil. However, this meal has a substantially higher nutritional value that soybean meal from conventional solvent extraction, with the resultant higher selling prices at least partially offsetting the oil loss.

The crude soybean oil is then degummed and bleached by conventional processes. That is, the crude soybean oil is intimately mixed with water, which may contain citric acid or a similar organic acid, to form gums of the hydratable phospholipids, which are then removed from the crude oil, e.g., by centrifuging. The degummed oil is then bleached with bleaching materials, such as clay, silica gel, and if needed, sodium metasilicate.

At this stage, the oil is a useful product known as a first refined oil. However, for many applications it is desirable to further process the oil to remove free fatty acids and components that contribute to the color and flavor of the oil. In the present process, it is possible to remove the free fatty acids without the caustic refining required in prior art processes. Instead, the free fatty acids are removed at the same time as the flavor and color components are removed during physical refining. As noted earlier, removal of free fatty acids by physical refining has not been feasible due to the large amount of non-hydratable phospholipids in the oil, which degraded under the high temperatures required for physical distillation. In the present process, however, the amount of non-hydratable phospholipids is generally less that 2.0 ppm based on the weight of phosphorous in the compounds. As a result, the breakdown of any non-hydratable phospholipids present makes an insignificant contribution to the oil flavor and stability.

During the physical refining stage of the invention, free fatty acids and flavor components are then removed from the oil by heating the oil in a distillation column to a temperature of from about 450° F. to about 500° F., and preferably for from about 460° F. to about 480° F., to distill off the free fatty acids and flavor materials. By industry standards, the final oil should contain less than about 0.03% free fatty acids.

Thus, the present invention provides a solvent extraction free and caustic refining free process for extracting and refining soybean oil. Perhaps as a result of avoiding the addition of solvents, such as hexane, and caustic materials to the oil during processing, and the resulting residue of these materials that is not subsequently removed from the oil, the present process results in an oil with lower impurities. In addition, the present process in comparison to conventional solvent extraction and caustic refining processes forms lower non-hydratable phospholipids. It is believed that these differences in the present oil compared to soybean oils produced by other processes may contribute to the observed superiority of the present oil.

Certain modifications and improvements will occur to those skilled in the art upon a reading of the foregoing description. It should be understood that all such modifications and improvements have been deleted herein for the sake of conciseness and readability but are properly within the scope of the follow claims.

What is claimed is:

1. A process for producing soybean oil from soybeans comprising:
   a) extracting soybean oil from soybeans in less than about 30 seconds while heating said soybeans to a temperature of from about 300° F. to about 370° F.; and
   b) heating the soybean oil to a temperature of from about 450° F. to about 500° F. under a vacuum to remove free fatty acids from said soybean oil.

2. The process of claim 1, wherein said soybean oil is extracted by screw extruding said soybeans.

3. The process of claim 1, further including degumming said soybean oil following extraction.

4. The process of claim 1, further including bleaching said soybean oil following extraction.

5. The process of claim 1, wherein said oil is extracted at a temperature of from about 315° F. to about 350° F.

6. The process of claim 1, wherein said oil is extracted in from about 10 seconds to about 15 seconds.

7. The process of claim 1, wherein said soybeans are heated by friction.

8. A process for producing a first refined soybean oil from soybeans comprising:

a) extracting soybean oil from soybeans in less than about 30 seconds while heating said soybeans to a temperature of from about 300° F. to about 370° F.;

b) degumming the soybean oil; and c) bleaching the soybean oil.

9. The process of claim 8, wherein said soybean oil is degummed by mixing said soybean oil with water to form gums, and separating said gums from said oil.

10. The process of claim 8, wherein said soybean oil is extracted in less than 15 seconds, while heating said soybeans to a temperature of from about 315° F. to about 335° F.

11. The process of claim 8, wherein said oil is extracted by screw extrusion to separate said oil into soybean oil and soybean meal.

12. The process of claim 8, wherein said soybean meal is pressed to separate residual soybean oil.

13. A solvent extraction free, caustic refining free, process for producing refined soybean oil from soybeans comprising:

a) extracting soybean oil from soybeans by extruding said soybeans through a screw extruder in less than about 30 seconds while heating said soybeans to a temperature of from about 300° F. to about 370° F.;

b) degumming the soybean oil;

c) bleaching the soybean oil; and d) heating the soybean oil to a temperature of from about 450° F. to about 500° F. under a vacuum to remove free fatty acids from said soybean oil.

14. The process of claim 13, wherein said soybeans are separated into soybean oil and soybean meal, and said process includes the further step of separating residual soybean oil for said soybean meal.

15. The process of claim 14, wherein said residual soybean oil is separated from said soybean meal by screw extrusion.

16. The process of claim 13, wherein said soybean oil is degummed by mixing said soybean oil with water to form gums, and separating said gums from said oil.

17. The process of claim 8, wherein said soybean oil is extracted in less than 15 seconds, while heating said soybeans to a temperature of from about 315° F. to about 335° F.

* * * * *